US012572663B2

(12) United States Patent
Schneider et al.

(10) Patent No.: US 12,572,663 B2
(45) Date of Patent: Mar. 10, 2026

(54) METHOD FOR CHECKING THE INTEGRITY OF A COMPUTE NODE

(71) Applicant: Robert Bosch GmbH, Stuttgart (DE)

(72) Inventors: Peter Schneider, Holzgerlingen (DE); Sascha Guebner, Bodenburg (DE); Sebastian Schildt, Weissach (DE)

(73) Assignee: ROBERT BOSCH GMBH, Stuttgart (DE)

( * ) Notice: Subject to any disclaimer, the term of this patent is extended or adjusted under 35 U.S.C. 154(b) by 79 days.

(21) Appl. No.: 18/441,215

(22) Filed: Feb. 14, 2024

(65) Prior Publication Data

US 2024/0303346 A1 Sep. 12, 2024

(30) Foreign Application Priority Data

Mar. 7, 2023 (DE) ..................... 10 2023 202 024.6

(51) Int. Cl.
*G06F 21/57* (2013.01)
*G06F 21/64* (2013.01)

(52) U.S. Cl.
CPC ............ *G06F 21/577* (2013.01); *G06F 21/64* (2013.01)

(58) Field of Classification Search
CPC .................................................... G06F 21/577
See application file for complete search history.

(56) References Cited

U.S. PATENT DOCUMENTS

| | | | | |
|---|---|---|---|---|
| 9,104,617 B2 * | 8/2015 | Darrington | ......... | H04L 63/0227 |
| 9,906,559 B2 * | 2/2018 | Cudak | ..................... | H04L 67/10 |
| 10,146,642 B1 * | 12/2018 | Bent | ..................... | G06F 9/4856 |
| 11,146,302 B2 * | 10/2021 | Marcum | .............. | H04B 1/3888 |
| 11,212,125 B2 * | 12/2021 | Cropper | .............. | H04L 67/1012 |
| 12,085,474 B2 * | 9/2024 | Yuan | ..................... | G01C 21/025 |
| 12,155,494 B2 * | 11/2024 | Cropper | .............. | G06F 9/5083 |
| 2017/0111224 A1 * | 4/2017 | Worley | .............. | H04L 43/0817 |
| 2019/0149572 A1 * | 5/2019 | Gorodissky | ............ | G06F 21/55 726/25 |
| 2019/0294563 A1 * | 9/2019 | Remis | ................. | G06F 11/3031 |
| 2019/0324874 A1 * | 10/2019 | Gill | ..................... | G06F 11/2094 |
| 2020/0051419 A1 * | 2/2020 | Malaver | ................. | H04L 67/10 |
| 2020/0177704 A1 * | 6/2020 | Nucci | ..................... | H04L 67/34 |
| 2020/0204620 A1 * | 6/2020 | Troy | ..................... | G06F 11/3006 |
| 2021/0081546 A1 * | 3/2021 | Falk | ..................... | G06F 11/3476 |
| 2021/0247743 A1 * | 8/2021 | Raj | ..................... | G06F 11/3055 |
| 2021/0314341 A1 * | 10/2021 | Moskovich | ......... | H04L 63/1416 |
| 2023/0275759 A1 * | 8/2023 | Majumdar | ............ | H04L 9/3239 713/171 |
| 2024/0146723 A1 * | 5/2024 | Hassani | ................ | B60W 50/14 |

FOREIGN PATENT DOCUMENTS

| | | |
|---|---|---|
| DE | 112016004678 T5 | 9/2018 |
| WO | 2021175566 A1 | 9/2021 |

* cited by examiner

*Primary Examiner* — Viral S Lakhia
(74) *Attorney, Agent, or Firm* — NORTON ROSE FULBRIGHT US LLP

(57) ABSTRACT

A method for checking the integrity of a compute node which is part of a network of compute nodes communicatively connected to one another, and on which at least one portion of a distributed application is executed. The method includes: providing test data for the compute node; generating test results by applying the at least one portion of the distributed application to the provided test data; and checking the integrity of the compute node by comparing the test results to expected results.

14 Claims, 1 Drawing Sheet

1 start provide test data for
the compute node          2 temporarily store and
subsequently reset
internal state of
compute node          5 generate test results          3 check integrity of
compute node          4 system provision unit          11 generation unit          12 checking unit          13 state unit          14

10

METHOD FOR CHECKING THE INTEGRITY OF A COMPUTE NODE

CROSS REFERENCE

The present application claims the benefit under 35 U.S.C. § 119 of German Patent Application No. DE 10 2023 202 024.6 filed on Mar. 7, 2023, which is expressly incorporated herein by reference in its entirety.

FIELD

The present invention relates to a method for checking the integrity of a compute node which is part of a network of compute nodes communicatively connected to one another, and on which at least one portion of a distributed application is executed.

BACKGROUND INFORMATION

Safety-critical applications, for example functions of an autonomously driving motor vehicle, are frequently implemented on specific embedded hardware, for example microcontrollers or microprocessors, in combination with specific basic software developed according to specific safety standards. Such safety-focused computing platforms usually have a series of built-in monitoring mechanisms, which make it possible at runtime to recognize potentially safety-critical errors and to mitigate them quickly.

A typical measure for proactively detecting hardware errors and failures within a computing platform are so-called built-in self-tests, which check the correct function of particular hardware components, for example of memories or computing units, via a series of test data patterns specifically developed for this purpose. In addition, purely software-based methods for detecting hardware errors are also available, which are based on a targeted extension of the application (assembler) code at the development time and function in a hardware-agnostic manner.

However, such methods are already integrated into the corresponding hardware and/or software components at the development time and are thus usually not suitable for networks of compute nodes communicatively connected to one another, for example cloud edge platforms. Software hardware stacks formed on compute nodes within a cloud are thus usually not designed for safety-critical applications. Rather, the configuration of such cloud edge platforms usually takes place dynamically at runtime, wherein applications share existing computing and/or communication resources with other applications, which can lead to mutual influences, in particular with regard to timing and runtime behavior, and wherein the portion of a compute node used in each case by a distributed application is often difficult to follow, for example due to many abstraction layers and runtime optimization methods. On the other hand, such cloud edge systems, however, offer comparatively high flexibility and resource efficiency during operation, for example. Consequently, there is a need for methods for checking the integrity of a compute node which is part of a network of compute nodes communicatively connected to one another, and on which at least one portion of a distributed application is executed, in order to be able to execute safety-relevant applications in such networks as well, for example cloud edge platforms.

The term "distributed application" is understood to mean a complex application program which runs on a plurality of compute nodes communicatively connected to one another, i.e., in a distributed system, wherein information is exchanged between the corresponding compute nodes.

The terms "integrity" and "integrity conditions" are furthermore understood to mean assumptions made about the data or the state, for example a particular data type, a value range or a dependency relationship between two objects.

PCT Patent Application No. WO 2021/175566 A1 describes a method for operating a hardware platform for the inference calculation of a neural network constructed in layers, wherein a first portion of input data, which is required for the inference calculation of a first layer of the neural network, and redundancy information, which relates to these input data, are read from an external working memory into an internal working memory of the computing unit, wherein the integrity of the input data is checked on the basis of the redundancy information, wherein, in response to the input data being recognized to be error-free, at least one portion of the inference calculation of the first layer is carried out for these input data by means of the computing unit in order to obtain a work result, wherein redundancy information is ascertained for the work result, on the basis of which redundancy information the integrity of the work result can be checked, and wherein the work result and the redundancy information are written into the external working memory.

SUMMARY

An object of the present invention is to provide a method by means of which the integrity of a compute node which is part of a network of compute nodes communicatively connected to one another, and on which at least one portion of a distributed application is executed, can be reliably checked.

The object be achieved by a method for checking the integrity of a compute node which is part of a network of compute nodes communicatively connected to one another, and on which at least one portion of a distributed application is executed, according to features of the present invention.

In addition, the object also may be achieved by a system for checking the integrity of a compute node which is part of a network of compute nodes communicatively connected to one another, and on which at least one portion of a distributed application is executed, according to features of the present invention.

The subject matter of the present invention is also a corresponding computing unit, a computer program, and a machine-readable storage medium.

According to one example embodiment of the present invention, this object may be achieved by a method, in particular a computer-implemented method, for checking the integrity of a compute node which is part of a network of compute nodes communicatively connected to one another, and on which at least one portion of a distributed application is executed. According to an example embodiment of the present invention, test data are provided for the compute node, test results are generated by applying the at least one portion of the distributed application to the provided test data, and the integrity of the compute node is checked by comparing the test results to expected results.

Here, term "test data" is understood to mean data from the functional area of the corresponding compute node which are used for testing the integrity of the compute node with regard to the correct execution of at least one portion of a distributed application, and for which corresponding test results or expected results are known.

Such a method according to the present invention may have the advantage that it can also be used to reliably check the integrity with respect to systematic errors upon the execution of a specific application in a multitude of possible configurations, which change at runtime, within a network comprising a plurality of compute nodes communicatively connected or coupled to one another, or the correct configuration mode and functioning of the corresponding compute node. The method can in particular also be used if the executing software hardware stack of the corresponding compute node, that is to say the corresponding combination of cooperating software and hardware components of the compute node, is largely unknown. In addition, relevant system errors of the corresponding compute node can be ascertained comparatively promptly at runtime.

Overall, a method is thus specified according to the present invention, by means of which the integrity of a compute node which is part of a network of compute nodes communicatively connected to one another, and on which at least one portion of a distributed application is executed, can be reliably checked.

According to an example embodiment of the present invention, the step of providing test data can comprise storing the test data on the compute node. This has the advantage that the test data for checking the integrity are available without latencies or delays and without increased demand for communication resources.

In addition, according to an example embodiment of the present invention, the test data can comprise a multitude of atomic test data sets, and wherein the step of generating test results comprises generating test results on the basis of at least one of the multitude of atomic test data sets.

Here, the term "atomic test data sets" is understood to mean sets or amounts of test data, wherein the test data of a data set are not influenced by other processes outside the corresponding data set.

According to an example embodiment of the present invention, the method can thus be designed in such a way that, in a processing step, corresponding test results have to be generated only for a portion of the test data, in particular for at least exactly one atomic test data set, in order to check at least a partial integrity of the compute node. The method can furthermore be designed in such a way that a different atomic test data set is processed in each further processing step and the overall integrity of the compute node is thus checked gradually over time. The time for which corresponding user data processing has to be interrupted can thereby be shortened, which proves to be advantageous in particular in the case of latency-critical applications.

In addition, according to an example embodiment of the present invention, the method can also comprise a step of temporarily storing and subsequently resetting an internal state of the compute node before the test results are generated.

Here, the term "internal state" is understood to mean a processing state of the corresponding portion of the distributed application in the corresponding compute node.

Since the internal state is temporarily stored and subsequently reset before the test results are generated, it can be prevented that the internal state can be changed by generating the test results and that subsequent application data can no longer be processed correctly. This proves to be advantageous in particular when internal dependencies are present.

In one example embodiment of the present invention, the step of checking the integrity of the compute node furthermore comprises rounding and/or normalizing floating-point test results to integer results, generating a test signature on the basis of the test results, transmitting the test signature to a secure compute node within the network, and comparing the test signature to a comparison signature stored on the secure compute node.

According to an example embodiment of the present invention, the step of rounding and/or normalizing floating-point test results to integer results must take place before forming the signature, in order to suitably mask a computing platform-specific floating-point behavior and thus to generate the signature values expected in the error-free case.

Here, the term "test signature" or "digital signature" is understood to mean a certificate which represents the generated test results, wherein the authenticity or correctness of the test signature or of the certificate can be checked by comparison to a corresponding comparison signature. The test signature can in particular be a checksum, for example a hash value.

A secure compute node is furthermore a compute node which meets specified security requirements or safety standards and thus also fulfills its checking task with sufficient integrity.

As a result, it can be ensured that the integrity of the corresponding compute node can be checked even if the compute node itself is not classified as trustworthy, or it must be assumed that the compute note potentially operates in a faulty manner.

The test data can furthermore comprise sensor data.

A sensor, which is also referred to as a (measuring) probe, is a technical component that can detect certain physical or chemical properties and/or the material nature of its surroundings qualitatively or quantitatively as a measured variable.

Thus, circumstances outside the actual data processing system on which the integrity of the compute node is checked can be detected in a simple manner and can be taken into account upon checking the integrity.

A further embodiment of the present invention also provides a method for controlling a controllable system on the basis of a distributed application which is executed on a plurality of compute nodes within a network of compute nodes communicatively connected to one another. According to an example embodiment of the present invention, the method comprises detecting sensor data or measurement data, processing the sensor data by means of the distributed application, respectively checking the integrity of the compute nodes on which at least one portion of the distributed application is executed, by means of a method described above for checking the integrity of a compute node, and controlling the controllable function on the basis of results of the processing of the sensor data by means of the distributed application and results of the checking of the integrity of the compute nodes.

Here the term "controllable system" is understood to mean, in particular, a robotic system, for example an autonomously driving motor vehicle.

The fact that the results of the checking of the integrity of the compute nodes is taken into account when controlling the controllable system furthermore means that, on the basis of the results of the checking of the integrity of the compute nodes, actions can be initiated, for example in a safety-oriented manner.

According to one embodiment of the present invention, the method comprises a step of outputting a signal in response to the comparison of the test results to expected results in the step of checking. The signal can represent a result of the checking, in particular an integrity of the compute node. The signal can additionally or alternatively be designed as a control signal in order to control, in response to the output control signal, the compute node and/or the network and/or the application, in particular to execute and/or to interrupt and/or to abort and/or to restart the application.

A method for controlling a controllable system is thus specified, which method is based on a method by means of which the integrity of a compute node which is part of a network of compute nodes communicatively connected to one another, and on which at least one portion of a distributed application is executed, can be reliably checked. In particular, the method for controlling a controllable system is based on a method which can also be used to reliably check the integrity with respect to systematic errors upon the execution of a specific application in a multitude of possible configurations, which change at runtime, within a network comprising a plurality of compute nodes communicatively connected or coupled to one another, or the correct configuration mode and functioning of the corresponding compute node. The method can in particular also be used if the executing software hardware stack of the corresponding compute node, that is to say the corresponding combination of cooperating software and hardware components of the compute node, is largely unknown. In addition, relevant system errors of the corresponding compute node can be ascertained comparatively promptly at runtime.

A further embodiment of the present invention furthermore also provides a system for checking the integrity of a compute node which is part of a network of compute nodes communicatively connected to one another, and on which at least one portion of a distributed application is executed. According to an example embodiment of the present invention, the system comprises a provision unit which is designed to provide test data for the compute node, a generation unit which is designed to generate test results by applying the at least one portion of the distributed application to the provided test data, and a checking unit which is designed to check the integrity of the compute node by comparing the test results to expected results. The checking unit can be designed as a computing unit, for example a processor. It is possible that the provision unit, the generation unit and the checking unit are designed as different computing units or together form a computing unit or a part of a computing unit.

A system is thus specified, by means of which the integrity of a compute node which is part of a network of compute nodes communicatively connected to one another, and on which at least one portion of a distributed application is executed, can be reliably checked. Such a system in particular has the advantage that it can also be used to reliably check the integrity with respect to systematic errors upon the execution of a specific application in a multitude of possible configurations, which change at runtime, within a network comprising a plurality of compute nodes communicatively connected or coupled to one another, or the correct configuration mode and functioning of the corresponding compute node. The system can in particular also be used if the executing software hardware stack of the corresponding compute node, that is to say the corresponding combination of cooperating software and hardware components of the compute node, is largely unknown. In addition, relevant system errors of the corresponding compute node can be ascertained comparatively promptly at runtime.

In this case, the provision unit can be designed to store the test data on the compute node. This has the advantage that the test data for checking the integrity are available without latencies or delays.

In addition, according to an example embodiment of the present invention, the test data can comprise a multitude of atomic test data sets, wherein the generation unit is designed to generate test results on the basis of at least one of the multitude of atomic test data sets. The system can thus be designed in such a way that corresponding test results have to be generated only for a portion of the test data, in particular for at least exactly one atomic test data set, in order to check the integrity of the compute node. The time for which corresponding user data processing has to be interrupted can thereby be shortened, which proves to be advantageous in particular in the case of latency-critical applications.

In this case, according to an example embodiment of the present invention, the system can furthermore comprise a state unit, which is designed to temporarily store and subsequently reset an internal state of the compute node before the test results are generated. Since the internal state is temporarily stored and subsequently reset before the test results are generated, it can be prevented that the internal state can be changed by generating the test results and that subsequent application data can no longer be processed correctly. This proves to be advantageous in particular when internal dependencies are present.

In one embodiment of the present invention, the checking unit is designed to generate a test signature on the basis of the test results, to transmit the test signature to a secure compute node within the network, and to compare the test signature to a comparison signature stored on the secure compute node. As a result, it can be ensured that the integrity of the corresponding compute node can be checked even if the compute node itself is not classified as trustworthy, or it must be assumed that the compute note potentially operates in a faulty manner.

In turn, the test data can furthermore comprise sensor data. Thus, circumstances outside the actual data processing system on which the integrity of the compute node is checked can be detected in a simple manner and can be taken into account upon checking the integrity.

A further embodiment of the present invention also additionally provides a system for controlling a controllable system on the basis of a distributed application which is executed on a plurality of compute nodes within a network of compute nodes communicatively connected to one another. According to an example embodiment of the present invention, the system comprises a detection unit for detecting sensor data or measurement data, and a processing unit which is designed to process the sensor data by means of the distributed application, and wherein the system is designed to in each case check the integrity of the compute nodes on which at least one portion of the distributed application is executed, by means of a system described above for checking the integrity of a compute node, and to control the controllable function on the basis of results of the processing of the sensor data by means of the distributed application and results of the checking of the integrity of the compute nodes.

A system for controlling a controllable system is thus provided, which system is based on a system by means of which the integrity of a compute node which is part of a network of compute nodes communicatively connected to one another, and on which at least one portion of a distributed application is executed, can be reliably checked. In particular, the system for controlling a controllable system is based on a system which can also be used to reliably check the integrity with respect to systematic errors upon the execution of a specific application in a multitude of possible configurations, which change at runtime, within a network comprising a plurality of compute nodes communicatively connected or coupled to one another, or the correct configuration mode and functioning of the corresponding compute node. The system can in particular also be used if the executing software hardware stack of the corresponding compute node, that is to say the corresponding combination of cooperating software and hardware components of the compute node, is largely unknown. In addition, relevant system errors of the corresponding compute node can be ascertained comparatively promptly at runtime.

In summary, it is noted that the present invention provides a method for checking the integrity of a compute node which is part of a network of compute nodes communicatively connected to one another, and on which at least one portion of a distributed application is executed.

The described embodiments and developments of the present invention can be combined with one another as desired.

Further possible embodiments, developments and implementations of the present invention also include combinations not explicitly mentioned of features of the present invention described above or in the following relating to the exemplary embodiments.

The figures are intended to impart further understanding of the embodiments of the present invention. They illustrate example embodiments of the present invention and, in connection with the description, serve to explain principles and features of the present invention.

Other embodiments and many of the mentioned advantages of the present invention are apparent from the figures. The illustrated elements of the figures are not necessarily shown to scale relative to one another.

DETAILED DESCRIPTION OF EXAMPLE EMBODIMENTS

Figures 1, 2:
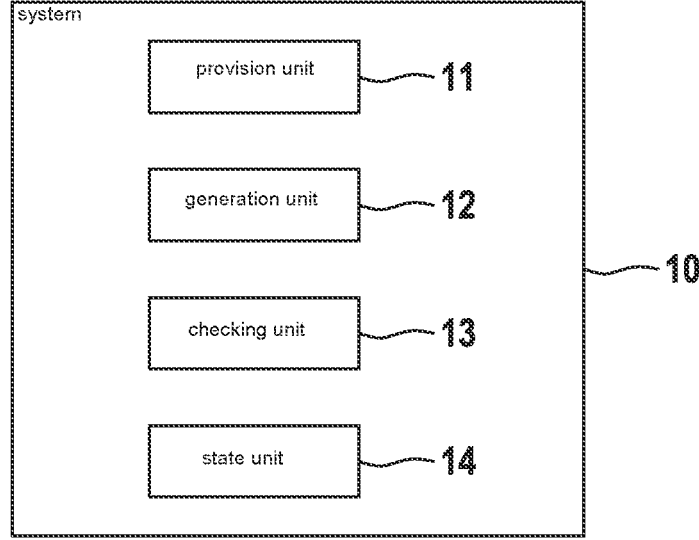
FIG. 1 shows a flow chart of a method for checking the integrity of a compute node which is part of a network of compute nodes communicatively connected to one another, and on which at least one portion of a distributed application is executed, according to example embodiments of the present invention.
FIG. 2 shows a schematic block diagram of a system for checking the integrity of a compute node which is part of a network of compute nodes communicatively connected to one another, and on which at least one portion of a distributed application is executed, according to example embodiments of the present invention.

In the figures of the figures, identical reference signs denote identical or functionally identical elements, parts or components, unless stated otherwise.

FIG. 1 shows a flow chart of a method for checking the integrity of a compute node which is part of a network of compute nodes communicatively connected to one another, and on which at least one portion of a distributed application is executed, according to embodiments of the present invention.

Safety-critical applications, for example functions of an autonomously driving motor vehicle, are frequently implemented on specific embedded hardware, for example microcontrollers or microprocessors, in combination with specific basic software developed according to specific safety standards. Such safety-focused computing platforms usually have a series of built-in monitoring mechanisms, which make it possible at runtime to recognize potentially safety-critical errors and to mitigate them quickly.

A typical measure for proactively detecting hardware errors and failures within a computing platform are so-called built-in self-tests, which check the correct function of particular hardware components, for example of memories or computing units, via a series of test data patterns specifically developed for this purpose. In addition, purely software-based methods for detecting hardware errors are also available, which are based on a targeted extension of the application (assembler) code at the development time and function in a hardware-agnostic manner.

However, such methods are already integrated into the corresponding hardware and/or software components at the development time and are thus usually not suitable for networks of compute nodes communicatively connected to one another, for example cloud edge platforms. Software hardware stacks formed on compute nodes within a cloud are thus usually not designed for safety-critical applications. Rather, the configuration of such cloud edge platforms usually takes place dynamically at runtime, wherein applications share existing computing and/or communication resources with other applications, which can lead to mutual influences, in particular with regard to timing and runtime behavior, and wherein the portion of a compute node used in each case by a distributed application is often difficult to follow, for example due to many abstraction layers and runtime optimization methods. On the other hand, such cloud edge systems, however, offer comparatively high flexibility and resource efficiency during operation, for example. Consequently, there is a need for methods for checking the integrity of a compute node which is part of a network of compute nodes communicatively connected to one another, and on which at least one portion of a distributed application is executed, in order to be able to execute safety-relevant applications in such networks as well, for example cloud edge platforms.

FIG. 1 shows a method 1, wherein test data are provided for the compute node in a step 2, test results are generated in a step 3 by applying the at least one portion of the distributed application to the provided test data, and the integrity of the compute node is checked in a step 4 by comparing the test results to expected results.

Such a method 1 has the advantage that it can also be used to reliably check the integrity with respect to systematic errors upon the execution of a specific application in a multitude of possible configurations, which change at runtime, within a network comprising a plurality of compute nodes communicatively connected or coupled to one another, or the correct configuration mode and functioning of the corresponding compute node. The method can in particular also be used if the executing software hardware stack of the corresponding compute node, that is to say the corresponding combination of cooperating software and hardware components of the compute node, is largely unknown. In addition, relevant system errors of the corresponding compute node can be ascertained comparatively promptly at runtime.

Overall, a method 1 is thus specified, by means of which the integrity of a compute node which is part of a network of compute nodes communicatively connected to one another, and on which at least one portion of a distributed application is executed, can be checked.

The test data can in this case be selected such that they generate as good a test image as possible of the corresponding application software with as few tests as possible.

Furthermore, test data sets which have already been generated at the development time within the scope of verification tests can also be used, for example.

The corresponding test results can furthermore have been tested or verified on a plurality of compute nodes.

Furthermore, the integrity can, for example, be checked every time the system is started, with each cycle or new input of the overall system, or at fixed intervals.

External data, for example time stamps, can furthermore be regarded as constant when the test results are generated. Data to be processed by the corresponding compute node can also be temporarily stored during the checking of the integrity, for example in a corresponding I/O gateway.

According to the embodiments of FIG. 1, the test data are stored on the corresponding compute node. Test data can be stored on the compute node at regular intervals and/or together with the call of the corresponding application and/or together with input data of the system.

In addition, the test data comprise a multitude of atomic test data sets, wherein the step 3 of generating test results comprises generating test results on the basis of at least one of the multitude of atomic test data sets.

In particular, a list with atomic test data sets can be stored on the corresponding compute node, which test data sets are then passed through alternately and cyclically.

As FIG. 1 shows, the method 1 also comprises a step 5 of temporarily storing and subsequently resetting an internal state of the compute node before the test results are generated.

According to the embodiments of FIG. 1, the step 4 of checking the integrity of the compute node also comprises rounding and/or normalizing floating-point test results to integer results, generating a test signature on the basis of the test results, transmitting the test signature to a secure compute node within the network, and comparing the test signature to a comparison signature stored on the secure compute node.

In order to keep the amount of data to be transmitted as small as possible, the test signature can in particular be a hash value, which can be compared to comparison values stored on the secure compute node, for example in the form of a look-up table.

According to the embodiments of FIG. 1, the test data comprise sensor data.

Such a method 1 can be used, for example when controlling a controllable system, for example a function of an autonomously driving motor vehicle, for example in order to secure the corresponding function of the autonomously driving motor vehicle.

In this case, safety-oriented actions can be initiated on the basis of the checking of the integrity of individual compute nodes, for example corresponding data may not be taken into account when controlling the controllable system.

In addition, a plurality of compute nodes can be checked simultaneously or successively, wherein conclusions about possible error sources are drawn from the check results, which makes a targeted reconfiguration or repair of the overall system possible.

FIG. 2 shows a schematic block diagram of a system for checking the integrity of a compute node which is part of a network of compute nodes communicatively connected to one another, and on which at least one portion of a distributed application is executed, according to embodiments of the present invention.

As FIG. 2 shows, the system 10 comprises a provision unit 11 which is designed to provide test data for the compute node, a generation unit 12 which is designed to generate test results by applying the at least one portion of the distributed application to the provided test data, and a checking unit 13 which is designed to check the integrity of the compute node by comparing the test results to expected results.

The provision unit can, for example, be a receiver which is designed to receive corresponding sensor data. The generation unit and the checking unit can also, for example, in each case be implemented on the basis of a code that is stored in a memory and can be executed by a processor.

The provision unit shown is in particular designed to store the test data on the corresponding compute node.

In addition, the test data in turn comprise a multitude of atomic test data sets, wherein the generation unit 12 is designed to generate test results on the basis of at least one of the multitude of atomic test data sets.

As FIG. 2 shows, the system 10 furthermore comprises a state unit 14 which is designed to temporarily store and subsequently reset an internal state of the compute node before the test results are generated by the generation unit 12.

In turn, the state unit can, for example, be implemented on the basis of code that is stored in a memory and can be executed by a processor.

According to the embodiments of FIG. 2, the checking unit 13 is also designed to generate a test signature on the basis of the test results, to transmit the test signature to a secure compute node within the network, and to compare the test signature to a comparison signature stored on the secure compute node.

In turn, the test data furthermore comprise sensor data.

The system 10 shown is also designed to perform a method described above for checking the integrity of a compute node which is part of a network of compute nodes communicatively connected to one another, and on which at least one portion of a distributed application is executed.

What is claimed:

1. A method for checking integrity of a compute node which is part of a network of compute nodes communicatively connected to one another, and on which at least one portion of a distributed application is executed for contributing to operation of a system by performing a particular process of the distributed application on runtime data provided, during runtime of the system, as input to the particular process, wherein the method comprises the following steps performed during runtime of the system in which the distributed application is performed:

storing an internal state in which the compute node is at a start of an integrity check session;

subsequent to the storing of the internal state, resetting the compute node to a predefined internal state;

providing predefined test data for the compute node;

subsequent to the resetting of the compute node and the providing of the predefined test data, performing, by the compute node the particular process using the provided predefined test data as the input to the particular process of the compute node, thereby generating, by the compute node, test results;

checking the integrity of the compute node by comparing the test results to expected results, which are results that are predefined as being expected when the predefined data is operated upon as input of the particular process; and subsequent to the performance of the particular process using the predefined test data, setting the compute node back to the stored internal state in which the compute node was at the start of the integrity check.

2. The method according to claim 1, wherein the step of providing test data includes storing the test data on the compute node.

3. The method according to claim 1, wherein the test data include a multitude of atomic test data sets, and wherein the step of generating test results includes generating test results based on exactly one of the multitude of atomic test data sets.

4. The method according to claim 1, wherein the step of checking the integrity of the compute node includes the following steps:

rounding and/or normalizing floating-point test results to integer results;

generating a test signature that digitally represents what the test results are in a compact form;

transmitting the test signature to a secure compute node within the network; and comparing the test signature to a comparison signature stored on the secure compute node.

5. The method according to claim 1, wherein the test data include sensor data.

6. A method for controlling a controllable system based on a distributed application which is executed on a plurality of compute nodes within a network of compute nodes communicatively connected to one another, wherein the method comprises the following steps during runtime of the system in which the distributed application is performed:

detecting runtime sensor data;

processing the runtime sensor data using the distributed application, wherein the processing of the sensor data includes each of one or more of the compute nodes executing a respective portion of the distributed application for contributing to operation of the system by performing a respective particular process of the distributed application on at least a portion of the runtime sensor data, which is used as input to the respective particular process;

for the each of the one or more of the compute nodes, checking an integrity of the respective compute node by:

providing predefined test data for the respective compute node;

subsequent to the resetting of the respective compute node and the providing of the predefined test data, performing, by the respective compute node the respective particular process of the respective compute node using the provided predefined test data as the input to the respective particular process of the respective compute node, thereby generating, by the compute node, test results;

checking the integrity of the respective compute node by comparing the test results to expected results, which are results that are predefined as being expected when the predefined data is operated upon as input of the respective particular process of the respective compute node; and subsequent to the performance of the particular process using the predefined test data, setting the respective compute node back to the stored internal state in which the respective compute node was at the start of the integrity check; and the controllable system responding to a result of the integrity checks by automatically modifying, based on the result of the integrity check, respective participation by respective ones of the plurality of compute nodes in continued processing of the runtime sensor data using the distributed application.

7. A first computing unit configured to check an integrity of a second compute node, the second computing node being part of a network of compute nodes communicatively connected to one another, and on which at least one portion of a distributed application is executed for contributing to operation of a system by performing a particular process of the distributed application on runtime data provided, during runtime of the system, as input to the particular process, wherein the computing unit is configured to:

receive test results, wherein the test results are generated by execution of an integrity check process on the second computing node, the integrity check process including performance of the following during the runtime of the system:

storing an internal state in which the second compute node is at a start of an integrity check session;

subsequent to the storing of the internal state, resetting the second compute node to a predefined internal state;

obtaining, by the second compute node, predefined test data; and subsequent to the resetting of the second compute node and the obtaining of the predefined test data, performing, by the second compute node the particular process using the obtained predefined test data as the input to the particular process of the second compute node, the second compute node thereby generating the test results by the particular process operating on the obtained predefined test data, the second compute node being set, subsequent to the performance of the particular process using the predefined test data, back to the stored internal state in which the compute node was at the start of the integrity check; and check the integrity of the second compute node by comparing the test results to expected results, which are results that are predefined as being expected when the predefined data is operated upon as input of the particular process.

8. A system comprising a network of compute nodes communicatively connected to one another, wherein at least one portion of a distributed application is executed on a compute node of the network of compute nodes for contributing to operation of the system by performing a particular process of the distributed application on runtime data provided, during runtime of the system, as input to the particular process, wherein the system is configured to perform the following during runtime of the system in which the distributed application is performed:

store an internal state in which the compute node is at a start of an integrity check session;

subsequent to the storing of the internal state, reset the compute node to a predefined internal state;

provide predefined test data for the compute node;

subsequent to the resetting of the compute node and the provision of the predefined test data, perform, by the compute node the particular process using the provided predefined test data as the input to the particular process of the compute node, thereby generating test results by applying the at least one portion of the distributed application to the provided test data;

check the integrity of the compute node by comparing the test results to expected results, which are results that are predefined as being expected when the predefined data is operated upon as input of the particular process; and subsequent to the performance of the particular process using the predefined test data, set the compute node back to the stored internal state in which the compute node was at the start of the integrity check.

9. The system according to claim 8, wherein compute node is configured to internally store the test data.

10. The system according to claim 8, wherein the test data include a multitude of atomic test data sets, and wherein the generation of the test results is based on at least one of the multitude of atomic test data sets.

11. The system according to claim 8, wherein the system is configured to generate a test signature that digitally represents what the test results are in a compact form and to transmit the test signature to a secure compute node within the network for comparison by the secure compute node of the test signature to a comparison signature stored on the secure compute node.

12. The system according to claim 8, wherein the test data include sensor data.

13. A system comprising:

a sensor system; and a network of compute nodes communicatively connected to one another, wherein the system is configured to perform the following during runtime of the system:

obtain sensor data generated from detections by the sensor system;

execute at least one portion of a distributed application on a compute node of the network of computing nodes for contributing to operation of the system by performing a particular process of the distributed application on the obtained sensor data, which is provided, during the runtime of the system, as input to the particular process;

store an internal state in which the compute node is at a start of an integrity check session;

subsequent to the storing of the internal state, reset the compute node to a predefined internal state;

provide predefined test data for the compute node;

subsequent to the resetting of the compute node and the provision of the predefined test data, perform, by the compute node the particular process using the provided predefined test data as the input to the particular process of the compute node, thereby generating test results by applying the at least one portion of the distributed application to the provided test data;

check the integrity of the compute node by comparing the test results to expected results, which are results that are predefined as being expected when the predefined data is operated upon as input of the particular process;

subsequent to the performance of the particular process using the predefined test data, set the compute node back to the stored internal state in which the compute node was at the start of the integrity check; and respond to a result of the integrity checks by automatically modifying, based on the result of the integrity check, respective participation by respective ones of the plurality of compute nodes in continued processing of the runtime sensor data using the distributed application.

14. A non-transitory machine-readable storage medium on which is stored computer-readable instructions for checking integrity of a compute node which is part of a network of compute nodes communicatively connected to one another, and on which at least one portion of a distributed application is executed for contributing to operation of a system by performing a particular process of the distributed application on runtime data provided, during runtime of the system, as input to the particular process, wherein the instructions, when executed by the system, causes the system to perform the following steps during a runtime of the system in which the distributed application is performed:

storing an internal state in which the compute node is at a start of an integrity check session;

subsequent to the storing of the internal state, resetting the compute node to a predefined internal state;

providing predefined test data for the compute node;

subsequent to the resetting of the compute node and the providing of the predefined test data, performing, by the compute node the particular process using the provided predefined test data as the input to the particular process of the compute node, thereby generating, by the compute node, test results;

checking the integrity of the compute node by comparing the test results to expected results, which are results that are predefined as being expected when the predefined data is operated upon as input of the particular process; and subsequent to the performance of the particular process using the predefined test data, setting the compute node back to the stored internal state in which the compute node was at the start of the integrity check.

* * * * *